Figure 1:
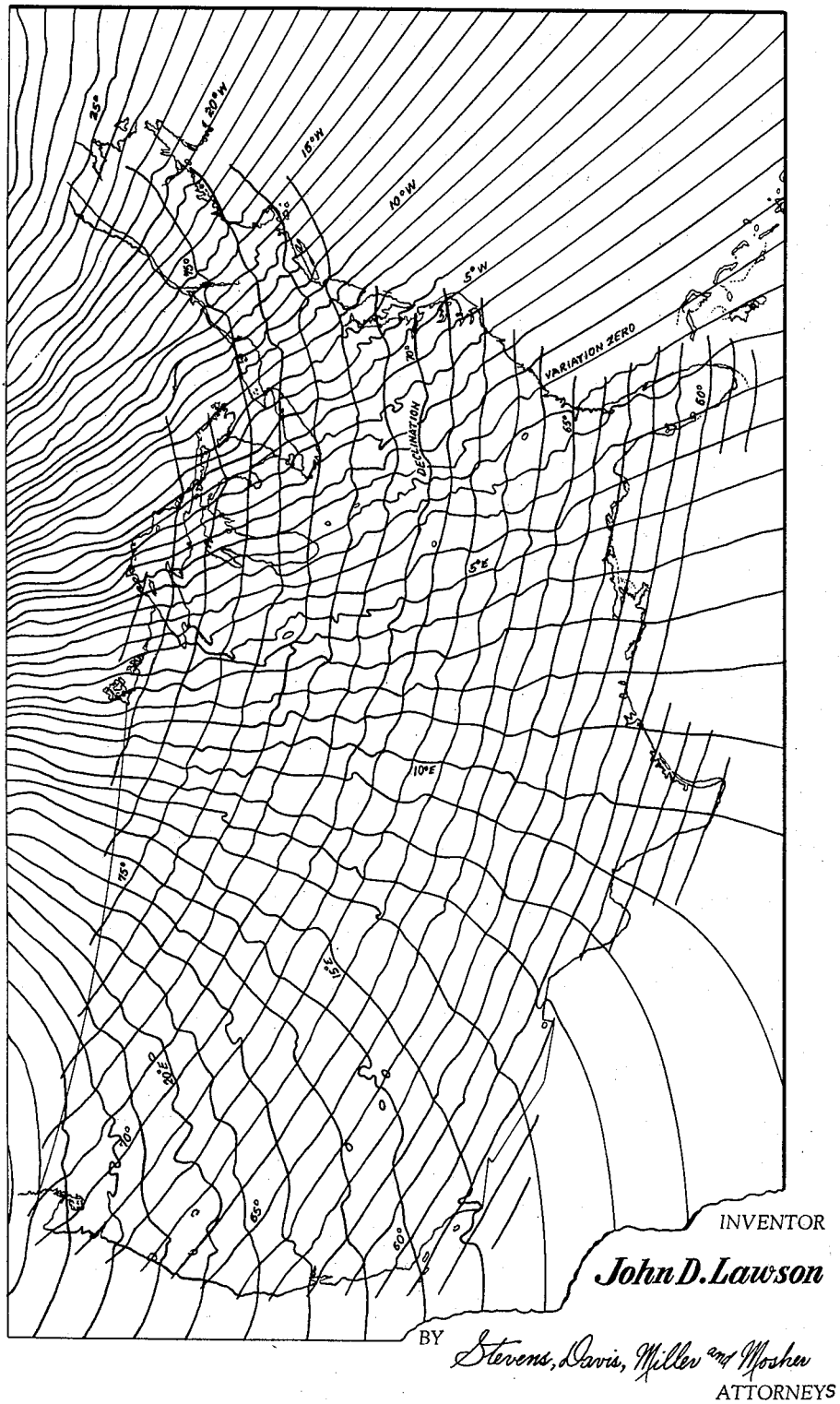

June 2, 1959  J. D. LAWSON  2,888,752
NAVIGATION SYSTEM
Filed Aug. 29, 1955  2 Sheets-Sheet 2

INVENTOR
John D. Lawson
BY Stevens, Davis, Miller and Mosher
ATTORNEYS

United States Patent Office 2,888,752
Patented June 2, 1959

2,888,752

NAVIGATION SYSTEM

John D. Lawson, Dallas, Tex., assignor to Texas Instruments Incorporated, Dallas, Tex., a corporation of Delaware Application August 29, 1955, Serial No. 531,156

4 Claims. (Cl. 33—204)

This invention relates to a method and apparatus for fixing position on or above the surface of the earth, and more particularly to a system for this purpose that involves neither radio signals nor celestial navigation, with their attendant disadvantages.

Celestial navigation is satisfactory only when the weather conditions permit the making of the necessary observations, and radio navigation is subject to both man-made and accidental interference and to failure of relatively complicated equipment. The method and apparatus of this invention, however, depend entirely upon relatively simple equipment carried by the vehicle itself and upon natural phenomena that exist permanently and are not subject to the failures or interference normally associated with relatively complicated radio navigation equipment, such, for example, as "loran."

Briefly, this invention consists in measuring magnetic variation or declination and magnetic inclination and combining these two measurements to determine the position of the observer on, or over or under, the surface of the earth.

Magnetic variation or declination is the angle between the direction indicated as North at any given point on the earth's surface and true North, as indicated by the direction of the earth's axis. Since the geographic North Pole and the magnetic North Pole are not located at the same place, it will be immediately apparent why a magnetic compass needle does not point accurately to geographic North. Furthermore, various conditions of the earth, such as iron deposits and the like, prevent the angle of variation from being completely regular in its change as we vary from point to point on the surface of the earth. Nevertheless, there is a sufficient regularity about the variation so that lines of equal magnetic variation may be plotted upon a map, and these lines of equal variation extend generally in a north and south direction. The U.S. Geological Survey and other agencies have measured the magnetic variation at many points on the surface of the earth and have prepared maps showing lines of equal magnetic variation, so that they are readily available for use in connection with the method and apparatus of this invention.

Magnetic inclination is the angle at which a magnet needle dips about a horizontal axis when it is oriented toward the magnetic North Pole and allowed freely so to do. This angle is measured from the horizontal plane and, within the continental United States, varies around 56° to around 78°. As with variation, magnetic inclination has been measured by the U.S. Geological Survey and others and lines of equal magnetic inclination have been plotted upon a map in the same way. These lines, however, extend generally in an easterly-westerly direction.

The lines of equal magnetic variation are known as isogonal lines and the lines of equal magnetic declination are known as isoclinal lines. Because these lines are substantially at right angles to each other, as a general rule, a pair of measurements that will place the observer on one particular isogonal line and on one particular isoclinal line will fix his position on the surface of the earth.

The apparatus of this invention may take a number of forms, but generally comprises a compass or a similar means to indicate magnetic North, a gyrocompass to indicate true North, and means to compare the two indications to determine magnetic variation, thus determining the isogonal line of position, which is generally similar to longitude. The other half of the apparatus consists of a magnetic inclinometer arranged to measure magnetic dip, coupled with a device for determining the angle of the earth's surface at the place of measurement so as to give a base line from which the angle of dip may be measured, thus giving an accurate measurement of the angle of dip, which places the observer on the proper isoclinal line, which is generally similar to a line of latitude. By reference to a map carrying isogonal and isoclinal lines, the actual position may be determined and, assuming that this same map carries lines of longitude and latitude, the conversion to longitude and latitude can be expediently made.

Figure 2:
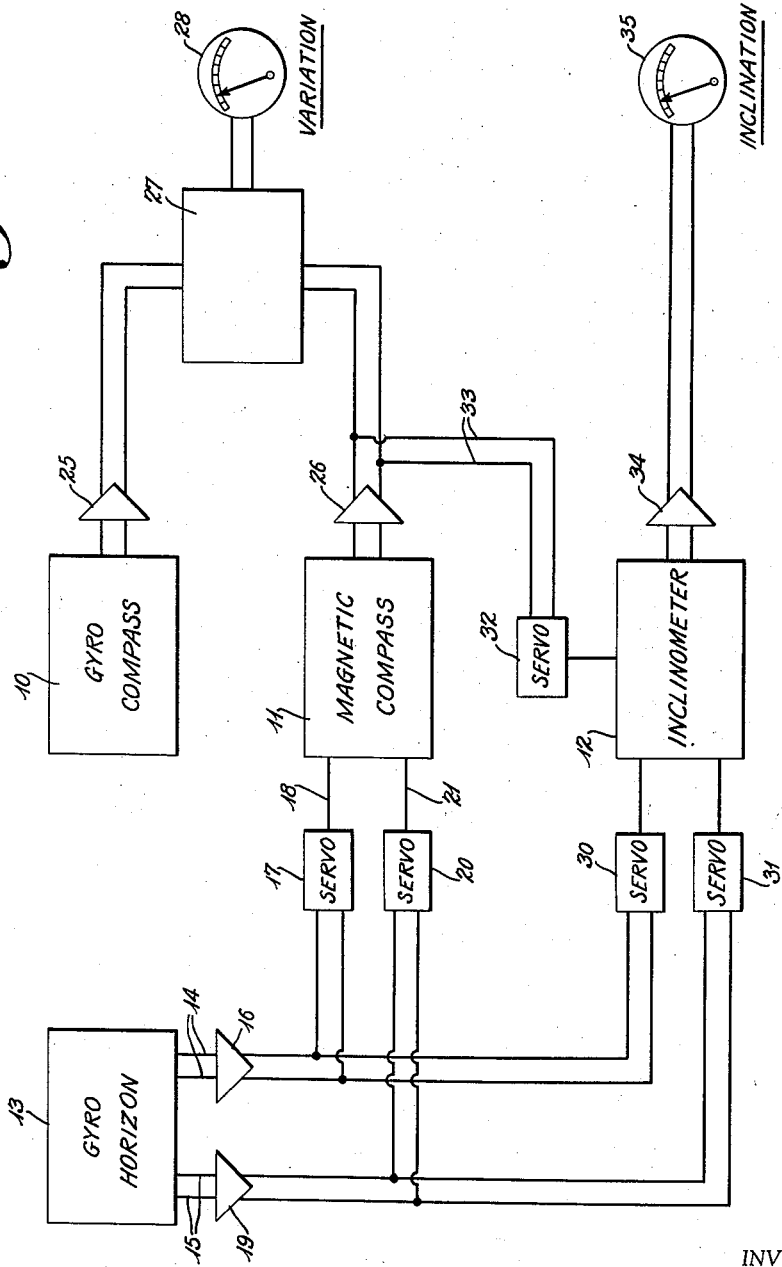

Further details and advantages of this invention will be apparent from the following detailed description of the preferred embodiment thereof. This embodiment is illustrated in the appended drawings, in which:

Figure 1 is a map of the United States, in outline form, but carrying a set of isogonal lines extending generally north and south across the United States and a set of isoclinal lines extending generally east and west across the United States; and Figure 2 is a schematic diagram of apparatus for accomplishing the method of this invention.

As illustrated in Figure 1, the locus of all points of equal magnetic variation forms a line across the map which is generally north and south. Take, for example, the line indicated as variation zero, which passes approximately through Charleston, South Carolina, and along a part of the eastern edge of Lake Michigan and through about the middle of Lake Superior, or the line indicating variation 10° east, which passes approximately through the southernmost tip of Texas. It is true that these lines are not all north and south, but generally they form a quite satisfactory grid with the lines that indicate equal inclination, for example, the lines that extend approximately east and west across the United States; note the 70° line that starts about at Norfolk and extends west across the United States and strikes the West Coast approximately at Puget Sound. From an inspection of the map of Figure 1, it will be apparent that a position indicated by a 60° westerly variation and a 71° inclination could only be at approximately Washington, D.C., whereas a position indicated by an 18° easterly variation and a 62° inclination would, of necessity, be approximately at San Francisco.

In order to determine the variation and the inclination, it is necessary to make certain measurements, and it will be immediately apparent that the more accurate the measurements, the more accurate the determination of position. As illustrated in Figure 2, mechanism may be provided for making continuous automatic measurements of both variation and inclination, and these measurements may be readily converted into exact measurements of position by reference to a chart such as is shown in Figure 1.

The apparatus schematically illustrated in Figure 2 is adapted for use aboard an airplane or ship, or other vehicle, and is readily constructible from parts now available.

The fundamental pieces of equipment necessary for the construction of an apparatus in accordance with the principles of this invention consist of a gyrocompass 10, a magnetic compass 11 and an inclinometer 12. To these instruments it is usually desirable to add a gyrohorizon 13 when the equipment is to be carried in a moving vehicle, since the accelerations present in moving vehicles prevent the simple determination of the plane of the surface of the earth by gravitational means.

The gyrocompass 10 is an instrument for gyroscopically determining true geographic North, as distinguished from the directional gyro type of instrument normally found in aircraft, which simply holds the direction at which it is set for a temporary period of time. The gyrocompass or true-North-seeking element of this invention can be so arranged that it will yield an electrical output indicative of the heading of the vehicle with respect to true geographic North.

The magnetic compass 11 is an instrument for indicating the direction of the lines of magnetic flux of the earth's magnetic field in a horizontal plane. It need not be a magnetic compass needle or needles, although it may be. It may be a device of the general type of a magnetometer, in which the effect of the earth's field on an electrical current-carrying coil or coils acts so as to give an indication of direction of the earth's magnetic field. The magnetic compass 11, regardless of the details of its construction, is preferably highly sensitive and can be so arranged as to give an electrical output indicative of the direction of the earth's magnetic flux in the horizontal plane with respect to the heading of the vehicle on which the device is carried.

The same remarks that have been made with respect to the magnetic compass 11 apply generally to the inclinometer 12, except that the inclinometer 12 is adapted to measure the angle of dip of the earth's magnetic flux in a vertical plane parallel to the flux.

Since it is well known that if a magnetic compass is turned on its side, or even partly on its side, it tends to become a dip needle and hence fails to indicate accurately the direction of the earth's flux in a horizontal plane, it is important to this invention, when it is to be used in a moving vehicle, that means be provided to maintain the magnetic compass in a horizontal plane. This may be accomplished by a gyrohorizon 13 of the type commonly found in aircraft, the gyrohorizon being with an electrical takeoff 14, indicating the pitch or the position of the longitudinal axis of the vessel or vehicle and an electrical takeoff 15, indicating the roll or the angular position of the transverse axis of the vessel or vehicle. The electrical output 14 is connected to an amplifier 16 which, in turn, is connected to a servo motor 17 which acts through a mechanical connection 18 to rotate the magnetic compass in appropriately formed gimbals about one axis so as to keep the magnetic compass level with the horizon about one of its axes. The electrical output 15 is connected to an amplifier 19 which, in turn, is connected to a servo motor 20 which operates through a mechanical connection 21 to rotate the magnetic compass in gimbals about another axis of 90° to the first so as to level the magnetic compass about that axis. Thus, in a conventional manner the magnetic compass is gyrostabilized and retained in a horizontal plane so that its readings will at all times be accurate.

The output of the gyrocompass is electrically connected to an amplifier 25 and that of the magnetic compass is electrically connected to the amplifier 26 and the two outputs are brought together in a comparison circuit 27, which subtracts one from the other to produce a difference indication which is then registered on a meter 28, the meter being so arranged that it reads in degrees and parts of degrees of easterly or westerly variation. Since there are many different types of circuits or mechanical devices that may be used to make this comparison and arrive at the indication of variation, attention is merely directed to the prior art for these circuits and mechanisms, and no specific circuit or mechanism will herein be described.

The inclinometer 12 is retained in a horizontal plane, that is, with the inclinometer needle in a vertical plane and rotating about a horizontal axis, by the use of a pair of servo motors 30 and 31 operated from the gyrohorizon 13 through amplifiers 16 and 19, respectively, in much the same manner as the magnetic compass is maintained in a horizontal plane. However, in order to have the inclinometer work properly, it is necessary also that it be oriented toward magnetic North, and this is accomplished by a third servo motor 32, which is operated from the output of the magnetic compass 11 through the amplifier 26 and appropriate connections 33. Thus, the inclinometer is held level and oriented in the proper magnetic direction for accurate measurement of inclination, and its output is amplified through an amplifier 34 and indicated on a meter 35.

It will at once be apparent that numerous variations in the apparatus described and in the details of the method will be possible within the scope of this invention, and it is intended that they shall be included within the scope of this application. For example, the various amplifiers indicated in Figure 2 may be omitted where they are not found to be necessary, and the magnetic compass and inclinometer may be mounted directly on a gyrostabilized platform, if desired, so that all servo mechanisms may be omitted. Furthermore, if the mechanism is to be used only in a position which is fixed at the time that the device is in use, the gyrohorizon may be completely omitted and the magnetic compass and inclinometer fixed in level position by the use of a plumb bob or level. Still further, the gyrohorizon may be used to maintain the magnetic compass in a horizontal plane if that is desirable. All of these, and many other modifications, are considered to be within the scope of this invention.

What is claimed is:

1. An apparatus for obtaining an indication of a geographic position that comprises gyroscopic means for sensing the direction of geographic North, magnetic means for sensing the direction of magnetic North, means for combining the two sensations to derive magnetic variation, means for sensing magnetic inclination so that the magnetic variation and magnetic inclination may be compared to determine geographic position and gyroscopic means for stabilizing and retaining in a horizontal plane said magnetic means and said means for sensing magnetic inclination.

2. An apparatus for obtaining an indication of a geographic position that comprises gyroscopic means for sensing the direction of geographic North, magnetic means for sensing the direction of magnetic North, electronic means for comparing the two sensations to derive a sensation of magnetic variation, means for sensing magnetic inclination so that the magnetic variation and magnetic inclination sensations may be compared to obtain an indication of the geographic position and gyroscopic means for stabilizing and retaining in a horizontal plane said magnetic means and said means for sensing magnetic inclination.

3. An apparatus for obtaining an indication of a geographic position that comprises gyroscopic means for sensing the direction of geographic North, magnetic means for sensing the direction of magnetic North, mechanical means for comparing the two sensations to derive a sensation of magnetic variation, means for sensing magnetic inclination so that the magnetic variation and magnetic inclination sensations may be compared to obtain an indication of the geographic position and gyroscopic means for stabilizing and retaining in a horizontal plane said magnetic means and said means for sensing magnetic inclination.

4. An apparatus for obtaining an indication of a geographic position that comprises gyroscopic means for sensing the direction of true North, magnetic means for sensing the direction of magnetic North, gyroscopic means for maintaining the magnetic means oriented in the horizontal plane, magnetic means for sensing magnetic inclination, means for maintaining the magnetic inclination sensing means oriented toward the magnetic North Pole and properly with respect to the horizontal plane, means to combine the sensations of geographic North and magnetic North to derive magnetic variation, means to indicate that variation and means to indicate the magnetic inclination derived by the inclination sensing means.

References Cited in the file of this patent

UNITED STATES PATENTS

| | | |
|---|---|---|
| 2,393,974 | Curry | Feb. 5, 1946 |
| 2,468,554 | Hull | Apr. 26, 1949 |
| 2,484,022 | Esval | Oct. 11, 1949 |
| 2,539,482 | Rothschild | Jan. 30, 1951 |
| 2,590,780 | Lynch | Mar. 25, 1952 |
| 2,631,455 | Wing | Mar. 17, 1953 |
| 2,699,612 | Kellog | Jan. 18, 1955 |

FOREIGN PATENTS

| | | |
|---|---|---|
| 419,635 | Italy | Apr. 2, 1947 |

OTHER REFERENCES

Witmer, E. E.: "The Use of the Earth's Electric and Magnetic Fields for the Determination of the Drift and Groundspeed of Aircraft," issued prior to June 1944, by Naval Aircraft Factory, Navy Yard, Philadelphia, Pennsylvania; 104 pages; pages 3d, 3e, 27 to 29 and 86 to 88 relied on.